United States Patent [19]
Bearden et al.

[11] Patent Number: 4,748,318
[45] Date of Patent: May 31, 1988

[54] WAND FOR A HAND-HELD COMBINED LIGHT PEN AND BAR CODE READER

[76] Inventors: James D. Bearden, 22483 Rio Aliso Dr., El Toro, Calif. 92630; William Floyd, 5531 Glenstone Dr., Huntington Beach, Calif. 92649

[21] Appl. No.: 922,050

[22] Filed: Oct. 22, 1986

[51] Int. Cl.$^4$ ............................................. G06K 7/10
[52] U.S. Cl. .................................................... 235/472
[58] Field of Search ......................................... 235/472

[56] References Cited

U.S. PATENT DOCUMENTS 4,682,016 7/1987 Inoue ............................. 235/472 X Primary Examiner—Harold I. Pitts
Attorney, Agent, or Firm—George F. Bethel; Patience K. Bethel

[57] ABSTRACT

A unitary hand-held wand incorporates two optical inputs with complete optical and electrical isolation between each of the inputs. In the illustrated embodiment the opto-electrical transducers include a light pen assembly and bar code sensor assembly. Each assembly is included within a housing which is divided into two substantially optically isolated cavities. The light pen assembly is disposed in one cavity and the bar code assembly in the other. The electrical portions of the light pen assembly and bar code assembly are each provided with electrical shields which are electrically isolated from their respective assemblies. The shields are in turn selectively coupled either to the power source ground or chassis ground. The light pen assembly and bar code assembly further include high gain preamplifiers which are additionally electrically shielded by a preamplifier shield. The preamplifier shielding in each case is electrically isolated from the corresponding light pen and bar code assembly electrical shield. A second embodiment includes a single optical input with both a light pen and bar code reader output. Appropriate signal processing circuitry is selectively switched between an amplified output from a single optical detector according to whether a light pen or bar code function is desired.

18 Claims, 3 Drawing Sheets

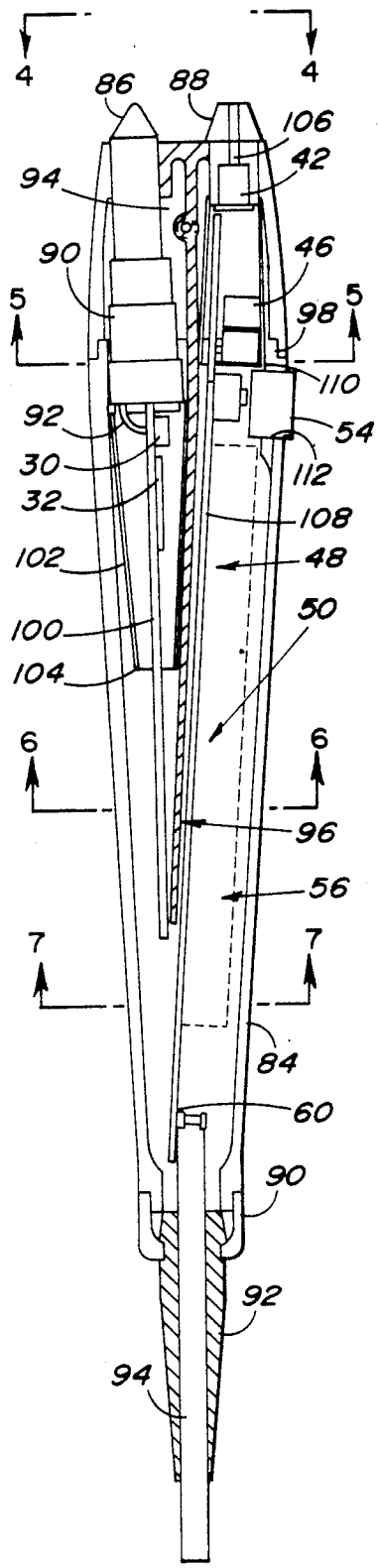
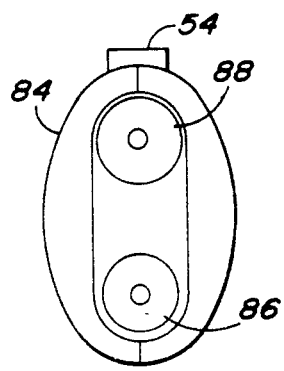
FIG. 4
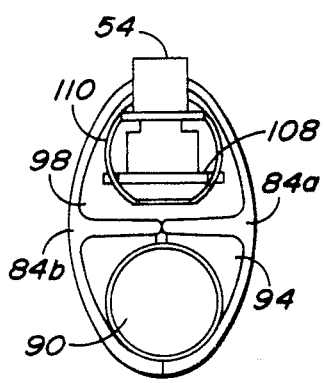
FIG. 5
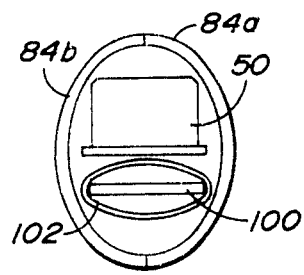
FIG. 6
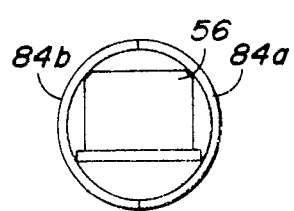
FIG. 7
FIG. 2
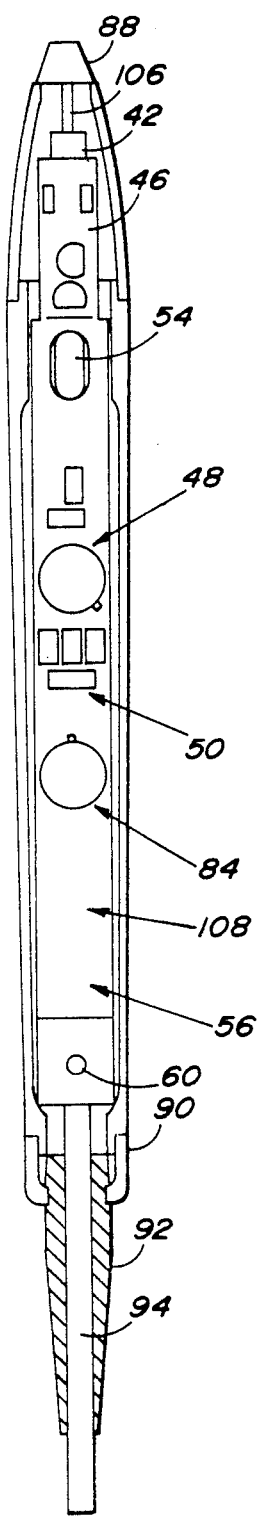
FIG. 3

WAND FOR A HAND-HELD COMBINED LIGHT PEN AND BAR CODE READER

BACKGROUND OF THE INVENTION

1. Field of the Invention

The invention relates to the field of hand-held input devices for computers and more particularly to a hand-held assembly which includes both a bar code wand and light pen.

2. Description of the Prior Art

Cathode ray tubes (CRT) are extensively used in displays at computer terminals wherein information is processed. CRT displays at computer terminals both provide the function of displaying information and for inputting information. Information may be input by means of a light pen which is used to select displayed entries. Thus in combination with a light pen, a CRT display becomes both an input and output device.

Similarly, a bar code scanning wand has been used in many applications as an input device for information processing systems, typically point of sale terminals or inventory systems. The use of bar code scanning permits fast, accurate and keyless data entry. Although it is known in the art to separately provide light pens and bar coded wands as input devices in connection with computers and CRT displays, no practical device has been devised whereby both input elements may be included within a single hand-held assembly.

Attempts have been made in the prior art to use a single sensor to function both as light pen and a bar code reader. For example, MONTEATH et al., "Apparatus Using a Light Sensing System Sensing Time Modulated Information from a Light-Emitting Device", U.S. Pat. No. 4,329,684 (1982), uses time modulation and demodulation of information obtained from light emitters and detectors. By detecting the type of modulation provided to the CRT display on one hand, or received from a bar code reflection on the other hand, the input information is decoded depending upon whether the sensor is being used as a light pen or bar code wand. This requires complex circuitry to modulate the CRT display as well as to appropriately decode the modulated signal to determine whether it is detecting a light pen or bar code input. The nature and complexity of the circuitry increases the cost of such an input device and provides a substantial impediment to packaging the necessary circuitry within a single hand-held assembly.

Others in the prior art have incorporated two input devices within a single hand-held assembly, such as shown by TAKAHASHI et al., "Input Pen Assembly", U.S. Pat. No. 4,263,592 (1981), wherein a conventional light pen and a conductive stylus have been combined within a single handheld wand for use with a CRT display on one hand and a digitizing tablet on the other. However, in TAKAHASHI what was combined was an input device having an optical input and a second input device having an electrical or capacitive input. No attempt was made in TAKAHASHI to include two separate optical input devices within a single hand-held assembly.

Therefore, what is needed is a packaging or assembly which can be economically fabricated and included within a single hand-held device for inputting two separate optical signals, such as CRT light pen inputs and bar code inputs without complex circuit designs or modifications.

BRIEF SUMMARY OF THE INVENTION

The invention is an optical input device comprising a first optical transducer circuit for generating a corresponding first electrical input signal. A second optical transducer circuit for generating a corresponding second electrical input signal is included. A first electrical shielding is arranged and configured in operative configuration with the first optical transducer circuit. A second separate electrical shielding is arranged and configured in operative configuration with the second optical transducer circuit. Optical shielding is provided for optically isolating the first and second optical transducer circuits one from the other. A hand-held housing encloses the first and second optical transducer circuit, the first and second electrical shielding and the optical shielding. As a result of this combination, two separate and independent optical transducers are included within a single hand-held optical input device.

In particular the first and second electrical shielding is electrically isolated from the first and second optical transducer circuits.

The optical input device further comprises a power ground terminal and chassis terminal. The first and second electrical shielding is selectively electrically coupled to the ground terminal or the chassis terminal.

The first and second optical transducer circuit each include a preamplifier. The optical input device further comprises a corresponding preamplifier shielding electrically unconnected to the first and second electrical shielding.

The first optical transducer circuit is a light pen and wherein the second optical transducer circuit is a bar code sensor.

The optical shielding circuit comprises a first and second cavity defined within the housing. The first and second cavities are completely optically isolated one from each other except at a distal end opposite the first and second optical transducer circuit. The first and second optical transducer circuit are disposed respectively into the first and second cavities within the housing.

The first and second electrical shielding each comprise a metallized plastic cone. Electrical portions of the first and second optical transducer circuits are completely disposed within the cones.

The first and second optical transducer circuit each includes a preamplifier and further comprise a corresponding preamplifier shielding electrically unconnected to the first and second electrical shielding. The preamplifier shielding is disposed completely within the corresponding cone serving as the electrical shielding.

Another embodiment of the invention is characterized as an integral hand-held optical input device comprising a single optical acceptor, and a single light emitting circuit for selectively generating light transmitted through the acceptor. A single light detecting circuit generates an electrical signal in response to light received through the acceptor. A preamplifier is coupled to the light detecting circuit. The preamplifier amplifies the electrical signal generated by the detecting circuit. A light pen processing circuit coupled to the preamplifier generates a light pen output pulse corresponding to the electrical signal. A bar code processing circuit is coupled to the preamplifier and generates a bar code output signal corresponding to the electrical signal. A circuit for selecting the light pen processing circuit or the bar code processing circuit is included and connected to those two circuits. A hand-held housing contains the acceptor, light emitting circuit, light detecting circuit, preamplifier, light pen and bar code processing circuit, and the circuit for selecting between the light pen and bar code processing circuits. As a result of this combination, a single hand-held optical input device is provided with two sequentially operable optical input functions.

The invention is also characterized as an assembly for an optical input device comprising a hand-held housing characterized by a longitudinal axis and defining a longitudinal cavity. A separating wall is disposed generally parallel with the longitudinal axis of the housing and extends from one end of the housing partially toward an opposing end of the housing. The separating wall optically divides the cavity defined within the housing into a first and second subcavity. Optical transmission between the first and second cavity is thus substantially prevented. A light pen assembly is disposed in the first subcavity. A bar code assembly is disposed in the second subcavity. The light pen assembly has an optical input transduced into an electrical output. The bar code assembly has an optical input transduced into an electrical output. As a result the hand-held assembly includes two separate and independent optical electrical transducing assemblies.

The light pen assembly comprises an electrical circuit portion. The electrical circuit portion is electrically shielded by a conductive shield. The shield is electrically isolated from the electrical portion of the light pen assembly. The bar code assembly comprises an electrical portion. The electrical portion of the bar code assembly is shielded by a conductive shield. The shield is electrically isolated from the electrical portion of the bar code assembly. The electrical portion of the light pen assembly and bar code assembly each includes a separate and independent preamplifier. Each preamplifier is shielded by a preamplifier shield. The preamplifier shield is electrically isolated from the corresponding circuit shield of the light pen assembly and bar code assembly.

The invention is illustrated in the following drawings wherein like elements are referenced by like numerals.

BRIEF DESCRIPTION OF THE DRAWINGS

FIG. 2 is a cross-sectional view of an assembly of the circuit of FIG. 1 in a wand.

FIG. 3 is a cross-sectional view of the wand of FIG. 2 taken through a section orthogonal to that shown in FIG. 2.

FIG. 4 is an end elevational view as seen through line 4—4

FIG. 5 is a cross-sectional view taken through section line 5—5 of FIG. 2.

FIG. 6 is a cross-sectional view of the wand of FIG. 2 as seen through sectional line 6—6 of FIG. 2.

FIG. 7 is a cross-sectional view of the wand of FIG. 2 as seen through section line 7—7 of FIG. 2.

The invention and its various embodiments may be better understood by now turning to the following detailed description.

DETAILED DESCRIPTION OF THE PREFERRED EMBODIMENTS

A unitary hand-held wand incorporates two optical inputs with complete optical and electrical isolation between each of the inputs. In the illustrated embodiment the opto-electrical transducers include a light pen assembly and bar code sensor assembly. Each assembly is included within a housing which is divided into two substantially optically isolated cavities. The light pen assembly is disposed in one cavity and the bar code assembly in the other. The electrical portions of the light pen assembly and bar code assembly are each provided with electrical shields which are electrically isolated from their respective assemblies. The shields are in turn selectively coupled either to the power source ground or chassis ground. The light pen assembly and bar code assembly further include high gain preamplifiers which are additionally electrically shielded by a preamplifier shield. The preamplifier shielding in each case is electrically isolated from the corresponding light pen and bar code assembly electrical shield.

A second embodiment includes a single optical input with both a light pen and bar code reader output. Appropriate signal processing circuitry is selectively switched between an amplified output from a single optical detector according to whether a light pen or bar code function is desired.

Figure 1:
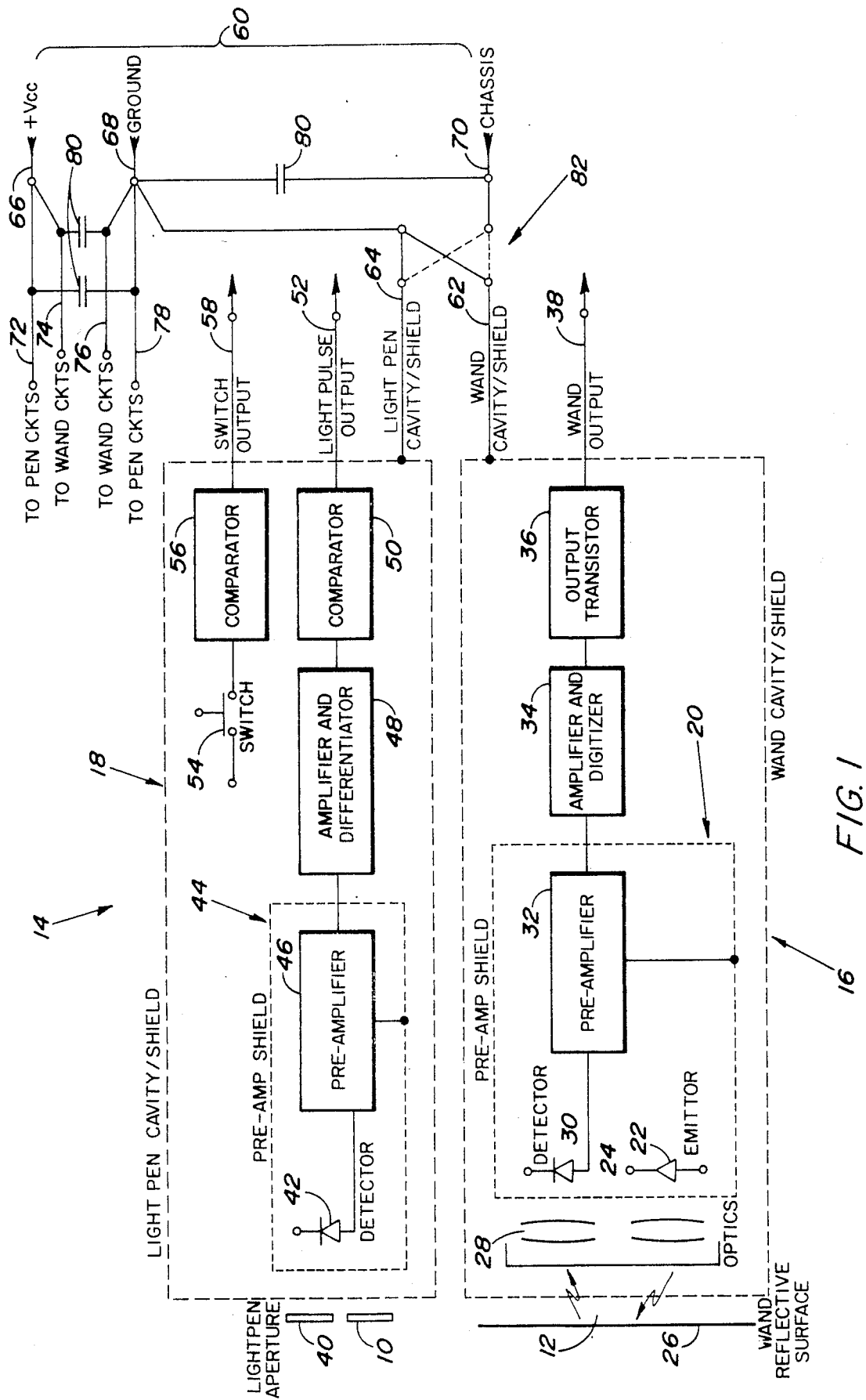
FIG. 1 is a schematic diagram of a first embodiment of the invention wherein a bar code reader and light pen are packaged within a single hand-held wand.

FIG. 1 is a schematic block diagram of a first embodiment of the invention wherein two separate optical apertures are provided for input to the bar code sensor and light pen sensor. These apertures are diagrammatically denoted by reference numerals 10 and 12. As will be discussed below, the circuitry within the unitary assembly, generally denoted by reference numeral 14, is also divided into separate and shielded portions. Thus, the embodiment of FIG. 1 provides a configuration with maximal mutual optical and electrical separation and shielding from the two optical input signals which are read by wand 14. The circuitry of wand 14 is organized within wand 14 into two separately shielded sections, namely a wand or bar code section 16 and a light pen section 18. Sections 16 and 18 are each separately shielded as indicated diagrammatically by the dotted line in FIG. 1 and as shown in the physical assembly drawing of FIGS. 2-7.

Consider first the circuit organization and electrical operation of each section 16 and 18. Section 18 includes a second preamp subsection, generally denoted by reference numeral 20, enclosed within a separate preamp shield, denoted by the dotted line defining subsection 20 in FIG. 1. A light emitting diode, diagrammatically denoted by diode 22, is powered by conventional circuit means omitted from FIG. 1 for the sake of simplicity. Emitter 22 generates a light beam which is focused by optical assembly 24, which in FIG. 1 is diagrammatically depicted as a single lens. In fact, optics 24 may include apertures, multiple numbers of lenses, and light tubes or more complex optics if desired.

Light focused from optics 24 is transmitted through aperture 12 to a reflective surface 26 which carries the bar code. Typically, surface 26 is the bar code portion on package labeling and the like. Reflected light from the bar code on surface 26 is received by receiving optics 28, again denoted in FIG. 1 diagrammatically as a single lens.

Focused reflected light from receiving optics 28 is concentrated on a photodetector 30. The output of photodetector 30 is coupled to a conventional high gain preamplifier 32 included within the preamp shield. The electrical signals generated within subsection 20 are thus well shielded from other nearby electrical signals within wand 14.

The output of preamplifier 32 is coupled to an amplifier and digitizer 34 which converts the analog output into an amplified digital signal. The digitized output from amplifier and digitizer 34 is then coupled to an output transistor or other equivalent buffer circuitry 36. The output of transistor 36 is provided on line 38 exterior to the bar code reader shielding of section 16. Again, the entire circuitry as a whole of the bar code reader within section 16 is thus well shielded from other electrical signals within wand 14. The output on line 38 is TTL compatible and is provided for direct connection to an appropriate input port in an associated computer terminal.

Consider now the second or light pen section 18 of wand 14. Light from the CRT display is incident through aperture 10 defined by aperture plate 40 which diagrammatically depicts a pinhole aperture in the illustration of FIG. 1. A conventional photodetector 42 is placed in optical communication with aperture 10 within a preamp subsection 34. The power and associated circuitry for photodetector 42 is conventional and has likewise been omitted for the sake of simplicity. Light detector 42 is a diffuse planar silicon phototransistor in which the detected light acts as a base injection current thereby resulting in an amplified output signal from the detector itself.

As in the case of the bar code reader preamp subsection 20, the light pen preamp subsection 44 is separately and well shielded within the shielding of light pen section 18. The output of detector 42 is provided as an input to a high gain preamplifier 46 within shielded preamp subsection 44. The output of preamplifier 46 is provided exterior to shielded subsection 44 to the input of an amplifier and differentiator 48 within shielded light pen section 18. The differentiated and amplified detected output from amplifier and differentiator 48 is then provided to the input of comparator 50. Comparator 50 has a preset threshold level to discriminate against noise. The output of comparator 50 is thus a TTL compatible light pulse signal provided exterior to shielded light pen section 18 on line 52.

It is generally appropriate for the light pen section 18 to include a manually actuated selection switch which allows the operator to initiate an interrupt or command signal to signify that the light pen is placed in the desired input position on the CRT. The activation switch is diagrammatically depicted by pushbutton switch 54 within light pen section 18 of wand 14 of FIG. 1. Pushbutton switch 54 is connected to the input of comparator 56. Comparator 56 has a preset threshold level to discriminate stray or false signals and to provide a TTL compatible output on line 58.

Thus, lines 38, 52 and 58 provide a wand output, light pulse output and actuation switch output for appropriate connection to the associated computer terminal.

The shields of bar code section 16 and light pen section 18 are each separately coupled by means of lines 62 and 64 to a termination block, generally denoted by reference numeral 60 in FIG. 1. The termination block provides a power supply input 66 to wand 14 together with a power ground coupling 68 and chassis coupling 70. As depicted in FIG. 1, the power supply is distributed through the termination block 60 to both the light pen and wand circuits as depicted at terminals 72 and 74. Similarly, the ground termination is supplied at all times to both sections at terminals diagrammatically depicted by nodes 76 and 78. High frequency filtering is provided by means of shunt capacitors 80 provided between power supply 66 and ground 68 in each case.

Chassis connection 70 is provided to wand 14 through termination block 60 by means of an internal jumper 82 to appropriately ground the shield of light pen section 18 and bar code reader section 16, either to the ground terminal 68 or chassis terminal 70, as may be desired.

The electrical circuitry within wand 14, now having been generally described, turn to the physical assembly drawings of FIGS. 2–7 wherein the circuitry of FIG. 1 is packaged. FIG. 2 is a longitudinal cross-sectional view of wand 14 showing a rigid plastic or insulating housing 84. As best illustrated in the plan elevational view of FIG. 4, the left end of wand 14 as depicted in FIG. 2, illustrates two acceptors 86 and 88 which are the optical input and output ports of wand 14. The opposing end of wand 14 is provided with an end fitting 90 adapted for maintaining a strain relief coupling 92. Strain relief coupling 92 carries an insulated cord 94 which includes power supply 66, ground 68, a chassis line 70 and output lines 38, 52 and 58.

Lower acceptor 86 as best shown in FIG. 4 provides the optical path for the bar code reader while the upper acceptor 88 provides the optical path for the light pen detector. As thus depicted in cross-sectional view in FIG. 2, acceptor 86 includes a conical end termination, through the apex of which light is emitted from a emitter 22 of FIG. 1 outwardly, and through which the reflected light from the bar code on the packaging is directed. Emitter 22 is included within cylindrical body assembly 90 in addition to a light pipe 92 which carries the reflected light to the rear of body 90 to detector 30. Acceptor 86 is conventional and in the illustrated embodiment a selected portion of the Model MSH110 of Opticon, Inc. is utilized.

Acceptor 86 is disposed within housing 84 within a bar code cavity generally denoted by reference numeral 94. Housing 84 includes an internal separating wall 96 which completely bifurcates the left two-thirds of wand 14 as depicted in FIG. 2. Cavity 94 is thus optically isolated from the opposing light pen cavity, generally denoted by reference numeral 98, which is similarly defined by wall 96 within housing 84. The sectional view of FIG. 5 taken through wand 84 in fact shows substantially identical molded halves 84a and 84b of housing 84. The two halves are then mated together in alignment, thereby defining cavities 94 and 98 which communicate with each other only at their rightmost extremity.

Detector 30 is disposed upon a printed circuit board 100 within cavity 94 which board is affixed to acceptor body 90. The circuitry of the bar code reader represented within bar code section 16 is placed upon circuit board 100 although not expressly depicted in FIG. 2. Preamp 32 is included on the circuit board 100. A conical metallic shield 102, fabricated from insulated half-hard copper sheet, is physically and electrically connected to body 90 of acceptor 86 and extends rearwardly to its tapered end to enclose preamplifier 32 and low level circuitry within bar code section 16. Only its rightmost end 104 as depicted in FIG. 2 is opened to cavity 94. The cross-sectional view of FIG. 6 taken through lines 6—6 of FIG. 2 shows the extension of shield 102 about board 100, while the sectional view of FIG. 7, taken through lines 7—7 of FIG. 2, illustrates that board 100 and shield 102 has terminated at that point while board 108 continues.

Similarly, acceptor 88 as shown in FIG. 2 provides a light pipe 106 to detector 42. Detector 42 is connected to a printed circuit board 108 disposed within cavity 98. Also disposed on the left end of printed circuit board 108 near detector 42 is preamplifier 46. An insulated copper shield 110 extends from detector 42 to the right as depicted in FIG. 2 thereby enclosing the left end of circuit board 108 and preamplifier 46. Immediately behind shield 110 is pushbutton 54, the button of which extends upwardly and out through an aperture 112 defined in housing 84.

Immediately to the right of switch 54 on circuit board 108 is video amplifier and differentiator 48 then comparator 50 and still further to the right switch comparator 56, all of which are diagrammatically depicted in FIG. 2 by a single dotted rectangular outline.

The rightmost portion of circuit board 108 includes termination block circuitry 60 as depicted in FIG. 1. It is here that physical connection is made with cord 94.

Thus it can now be appreciated by considering the packaging of wand 14 as depicted in FIGS. 2-7 how the individual preamplifiers in both the bar code section 16 and light pen section 18 are electrostatically and optically isolated one from the other. The shield for each preamplifier is connected only to the local ground of the associated preamplifier. The shields are otherwise electrically insulated from all other circuit elements. Thus these shields minimize the potential detrimental effects of radio and electromagnetic interference upon the low level preamplifier circuits. Reliable operation of the individual circuits cannot be obtained without effective shielding of the preamplifiers. If shields are effective in mutually shielding the light pen circuits and the wand circuits one from the other, they are also effective in shielding each of the circuits from other sources external to the individual shields.

In addition, individual cavity shields are provided for both the remaining portions of the light pen and wand circuits. This shielding is used to mutually shield the pen and the wand elements within wand 14 and furthermore to minimize the susceptibility of the wand in general to radio frequency interference, electromagnetic interference and electrostatic discharges from external sources. The section shields 16 and 18 are individual and electrically insulated from all elements within the wand circuitry except for their separate connection to a single point to ground or chassis as selected.

Figure 8:
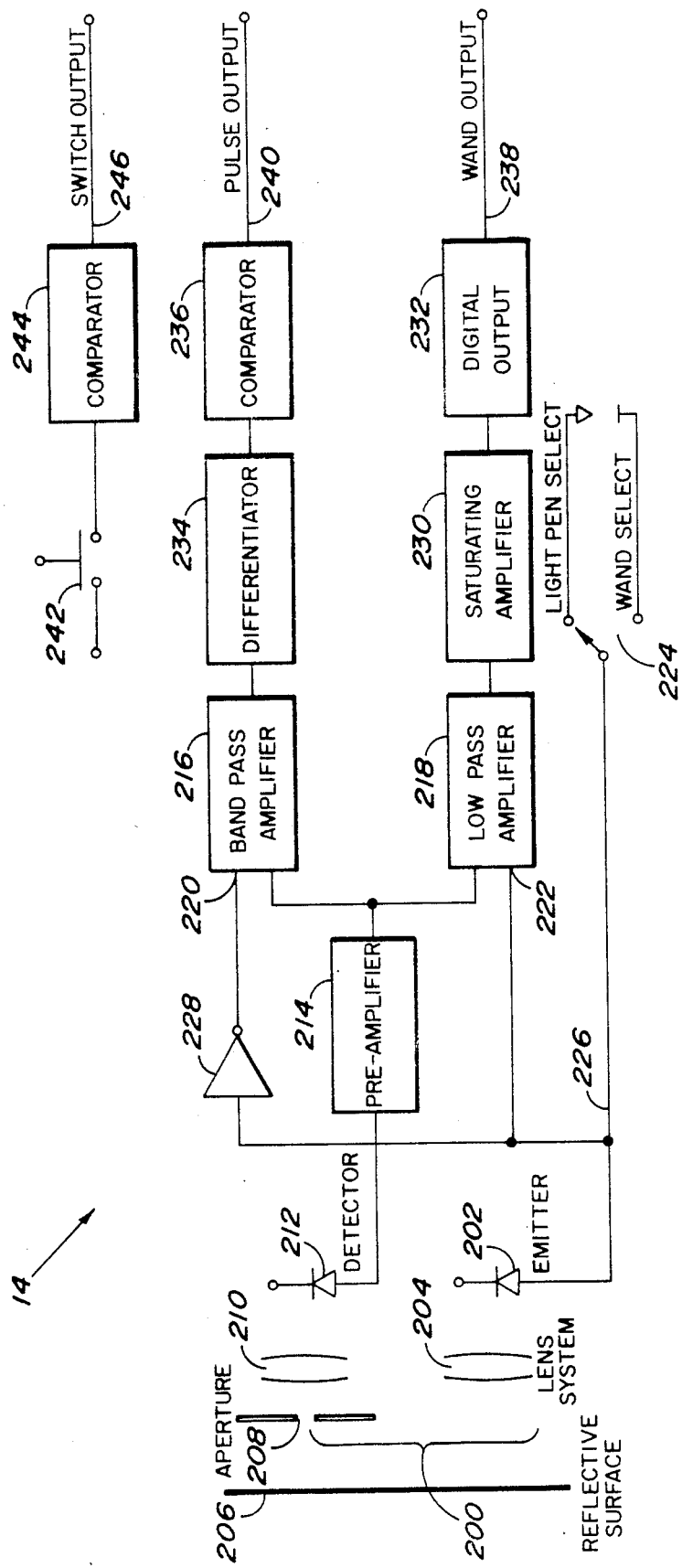
FIG. 8 is a block schematic diagram of a second embodiment of the invention wherein a single optical input port is provided.

Consider now the schematic diagram of FIG. 8 wherein a single optical acceptor is contemplated in a second embodiment of the invention. In FIG. 8 the wand, again generally denoted by reference numeral 14, would include a single aperture denoted generally by reference numeral 200. Light from a conventional light emitting diode 202 is again focused through optics 204 and aperture 200 to a surface 06. Again many minor circuit details have been deleted from the diagrammatic depiction of FIG. 8 in order to emphasize and clarify the teachings of the invention. Surface 206 may be a surface which carries a bar code or it may be a CRT screen. In either case, light is reflected or transmitted from surface 206 back through aperture 200 and impinges, at least in part, upon an aperture 208. The received light is focused through optics 210 onto a conventional photodetector 212.

The output signal from detector 212 is provided to a shielded high gain preamplifier 214 similar to that described in connection with the first embodiment of FIGS. 1-7. The output of amplifier 214 is then provided to the inputs of a bandpass amplifier 216 on one hand and a low pass amplifier 218 on the other. Amplifiers 216 and 218 are enabled or disabled according to command signals provided at the inputs 220 and 222. The command signals at inputs 220 and 222 to amplifiers 216 and 218 respectively are derived from a manually operated selection switch 224 which has an A position for light pen select and a B position for bar code select. Therefore, essentially either a one or zero signal is coupled to line 226 and provided directly to input 222 or through an inverter 228 to input 220. A one, corresponding to a light pen select from terminal A would serve, for example, to disable low pass amplifier 218 and enable bandpass amplifier 216. Similarly, if switch 224 were switched to B, a zero coupled to line 226 would enable low pass amplifier 218 and disable bandpass amplifier 216. In addition, photoemitter 202 is coupled to line 226 so that it is energized or activated when, for example, the B terminal or bar code selection has been made. Otherwise, emitter 202 remains off.

Assume that low pass amplifier 218 has been enabled. High frequency components in the output of preamplifier 214 are thus filtered out and the output of low pass amplifier 218 is provided as an input to saturating amplifier 230. Saturating amplifier 230 serves to digitize the output which corresponds to read bar code. The output of amplifier 230 is then coupled to a digital output amplifier 232 which generates a TTL compatible signal.

Similarly, if bandpass amplifier 216 were enabled, the output of amplifier 214 would be approximately modified and amplified by bandpass amplifier 216 in a manner similar to that described in connection with the first embodiment of FIGS. 1-7 and be provided to the input of differentiator 234. The signal is then differentiated and provided to the input of a comparator 236 where it is compared against a preset threshold value, again to screen out low level signals and noise. A light pen output is thereby provided at output 240.

In the same manner described in connection with the first embodiment an actuation signal is provided for use in combination with the light pen or for other uses. A conventional, manually operated pushbutton switch 242 couples a signal to comparator 244. The signal is compared against a preset threshold whereby noise and switch bounce is eliminated. A TTL compatible light pen actuation switch output is provided on output line 246.

Wand 14 of FIG. 8 would be packaged within a housing similar to that described in connection with FIGS. 2-7 with the exception that the two optical acceptors there illustrated would be replaced by a single acceptor. This configuration offers particular efficiency with respect to the optical components. In addition, only one preamplifier 214 and a single shield is required. However, additional circuiry for selection between the light pen and bar code reader is needed in the housing in addition to actuation switch 242.

Many modifications and alterations could be made by those having ordinary skill in the art without departing from the spirit and scope of the present invention. For example, wand 14 may be further modified to comprise a cordless unit. In order to be cordless, wand 14 would further include a chargeable battery power source and short range transmitters for each of the output signal lines. Suitable receivers would then need to be included within the computer terminal. Furthermore, if the bar code output is to be decoded within the circuitry of wand 14, communication with the computer terminal would then necessarily need to be two-way and a receiver channel as well would be included within the bar code circuitry.

Therefore, it must be understood that the illustrated embodiment has been set forth only for the purposes of example and should not be taken as limiting the invention which is defined by the following claims.

I claim:

1. An optical input device comprising:
   a first optical transducer means for generating a corresponding first electrical input signal;
   a second optical transducer means for generating a corresponding second electrical input signal;
   a first electrical shielding arranged and configured in operative configuration with said first optical transducer means;
   a second separate electrical shielding arranged and configured in operative configuration with said second optical transducer means;
   optical shielding means for optically isolating said first and second optical transducer means one from the other; and
   a hand-held housing enclosing said first and second optical transducer means, said first and second electrical shielding and said optical shielding,
   whereby two separate and independent optical transducers are included within a single hand-held optical input device.

2. The optical input device of claim 1 wherein said first and second electrical shielding is electrically isolated from said first and second optical transducer means.

3. The optical input device of claim 2 further including a power ground terminal and chassis terminal wherein said first and second electrical shielding is selectively electrically coupled to said ground terminal or said chassis terminal.

4. The optical input device of claim 1 wherein said first and second optical transducer means each includes a preamplifier and further comprising a corresponding preamplifier shielding electrically unconnected to said first and second electrical shielding.

5. The optical input device of claim 2 wherein said first and second optical transducer means each includes a preamplifier and further comprising a corresponding preamplifier shielding electrically unconnected to said first and second electrical shielding.

6. The optical input device of claim 3 wherein said first and second optical transducer means each includes a preamplifier and further comprising a corresponding preamplifier shielding electrically unconnected to said first and second electrical shielding.

7. The optical input device of claim 1 wherein said first optical transducer means is a light pen and wherein said second optical transducer means is a bar code sensor.

8. The optical input device of claim 1 wherein said optical shielding means comprises a first and second cavity defined within said housing, said first and second cavities completely optically isolated one from each other except at a distal end opposite said first and second optical transducer means, said first and second optical transducer means being disposed respectively into said first and second cavities within said housing.

9. The optical input device of claim 8 wherein said optical shielding means comprises a first and second cavity defined within said housing, said first and second cavities completely optically isolated one from each other except at a distal end opposite said first and second optical transducer means, said first and second optical transducer means being disposed respectively into said first and second cavities within said housing.

10. The optical input device of claim 1 wherein said first and second electrical shielding each comprises a metallized plastic cone, electrical portions of said first and second optical transducer means being completely disposed within said cones.

11. The optical input device of claim 10 wherein said first and second optical transducer means each includes a preamplifier and further comprising a corresponding preamplifier shielding electrically unconnected to said first and second electrical shielding wherein said preamplifier shielding is disposed completely within said corresponding cone serving as said electrical shielding.

12. An integral hand-held optical input device comprising:
    a single optical acceptor;
    a single light emitting means for selectively generating light transmitted through said acceptor;
    a single light detecting means for generating an electrical signal in response to light received through said acceptor;
    a preamplifier coupled to said light detecting means, said preamplifier for amplifying said electrical signal generated by said detecting means;
    light pen processing circuitry coupled to said preamplifier for generating a light pen output pulse corresponding to said electrical signal;
    bar code processing circuitry coupled to said preamplifier for generating a bar code output signal corresponding to said electrical signal;
    means for selecting said light pen processing circuitry or said bar code processing circuitry; and
    a hand-held housing for containing said acceptor, light emitting means, light detecting means, preamplifier, light pen and bar code processing circuitry, and means for selecting between said light pen and bar code processing circuitry,
    whereby a single hand-held optical input device is provided with two sequentially operable optical input functions.

13. An assembly for an optical input device comprising:
    a hand-held housing characterized by a longitudinal axis and defining a longitudinal cavity;
    a separating wall disposed generally parallel with said longitudinal axis of said housing and extending from one end of said housing partially toward an opposing end of said housing, said separating wall optically dividing said cavity defined within said housing into a first and second subcavity, optical transmission between said first and second cavity being substantially prevented;
    a light pen assembly disposed in said first subcavity;
    a bar code assembly disposed in said second subcavity, said light pen assembly having an optical input transduced into an electrical output, said bar code assembly having an optical input transduced into an electrical output, whereby said hand-held assembly includes two separate and independent optical electrical transducing assemblies.

14. The assembly of claim 13 wherein said light pen assembly comprises an electrical circuit portion, said electrical circuit portion being electrically shielded by a shield, said shield being electrically isolated from said electrical portion of said light pen assembly, and wherein said bar code assembly comprises an electrical portion, said electrical portion of said bar code assembly being shielded by a shield, said shield being electrically isolated from said electrical portion of said bar code assembly.

15. The assembly of claim 14 used in combination with a ground terminal wherein said shields of said electrical portions of said light pen and bar code assemblies are commonly and selectively coupled to said ground terminal.

16. The assembly of claim 15 wherein said ground terminal is selected to be a ground terminal common with a ground terminal of an electrical power source coupled to said assembly.

17. The assembly of claim 15 wherein said ground assembly is used in combination with a chassis and said ground terminal is selectively coupled to said chassis.

18. The assembly of claim 13 wherein said electrical portion of said light pen assembly and bar code assembly each includes a separate and independent preamplifier, each preamplifier being shielded by a preamplifier shield, said preamplifier shield being electrically isolated from said corresponding circuit shield of said light pen assembly and bar code assembly.

* * * * *